(12) United States Patent
de Chazal et al.

(10) Patent No.: US 10,988,041 B2
(45) Date of Patent: Apr. 27, 2021

(54) CABLE HEAT EXCHANGER FOR A POWER CONNECTOR

(71) Applicant: TE Connectivity Corporation, Berwyn, PA (US)

(72) Inventors: Aaron James de Chazal, Rochester, MI (US); Nathan Philip Myer, Lancaster, PA (US); Jeremy Christian Patterson, Winston-Salem, NC (US); Kevin John Peterson, Kernersville, NC (US); Clara Rhodes, Winston-Salem, NC (US); David Bruce Sarraf, Elizabethtown, PA (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/712,202

(22) Filed: Dec. 12, 2019

(65) Prior Publication Data

US 2020/0307400 A1    Oct. 1, 2020

Related U.S. Application Data (60) Provisional application No. 62/824,430, filed on Mar. 27, 2019.

(51) Int. Cl.
| | |
|---|---|
| *B60L 53/302* | (2019.01) |
| *B60L 53/18* | (2019.01) |
| *B60L 53/16* | (2019.01) |
| *H01B 7/42* | (2006.01) |
| *H01R 13/00* | (2006.01) |

(52) U.S. Cl.
CPC ............... *B60L 53/18* (2019.02); *B60L 53/16* (2019.02); *B60L 53/302* (2019.02); *H01B 7/426* (2013.01); *H01R 13/005* (2013.01); *H01R 2201/26* (2013.01)

(58) Field of Classification Search
CPC .......... B60L 53/16; B60L 53/18; B60L 53/22; B60L 53/302; H01B 7/423; H01B 7/426; H01R 13/005; H01R 2201/26
See application file for complete search history.

(56) References Cited

U.S. PATENT DOCUMENTS

| | | | |
|---|---|---|---|
| 2016/0270257 A1* | 9/2016 | Mark | H01R 9/11 |
| 2019/0291588 A1* | 9/2019 | Chou | H01R 13/005 |
| 2019/0315239 A1* | 10/2019 | Beimdieck | H01R 13/42 |
| 2019/0322186 A1* | 10/2019 | Arai | H01B 7/423 |

* cited by examiner

*Primary Examiner* — Jacob R Crum (57) ABSTRACT

A power connector includes a housing having a terminal channel holding a terminal. The terminal includes a mating pin at a front of the terminal and a cable connector at a rear of the terminal. The mating pin is positioned in the terminal channel for mating with a charging connector. The power connector includes a power cable including a conductor terminated to the cable connector at the rear of the terminal. The power connector includes a cable heat exchanger thermally coupled to the conductor of the power cable. The cable heat exchanger includes a coolant channel for coolant flow through the cable heat exchanger for actively cooling the conductor of the power cable. A thermally conductive separator electrically isolates the cable heat exchanger from the conductor of the power cable.

20 Claims, 7 Drawing Sheets

CABLE HEAT EXCHANGER FOR A POWER CONNECTOR

CROSS REFERENCE TO RELATED APPLICATIONS

This application claims the benefit of U.S. Provisional Application No. 62/824,430 filed Mar. 27, 2019, the subject matter of which is herein incorporated by reference in its entirety.

BACKGROUND OF THE INVENTION

The subject matter herein relates generally to heat exchangers for power connectors.

Electrical connectors, such as power connectors, generate heat when current flows through the terminals and cables of the power connectors. For example, a power connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

A need remains for a cooling system for cooling a power connector, such as for a charging inlet assembly.

BRIEF DESCRIPTION OF THE INVENTION

In one embodiment, a power connector is provided including a housing extending between a front and a rear with a chamber and a terminal channel between the front and the rear. The power connector includes a terminal coupled to the housing including a mating pin at a front of the terminal and a cable connector at a rear of the terminal. The mating pin is positioned in the terminal channel for mating with a charging connector. The cable connector is positioned in the chamber at the rear of the housing. The power connector includes a power cable including a conductor terminated to the cable connector at the rear of the terminal. The power connector includes a cable heat exchanger positioned in the chamber that is thermally coupled to the conductor of the power cable. The cable heat exchanger includes a coolant channel for coolant flow through the cable heat exchanger for actively cooling the conductor of the power cable. A thermally conductive separator electrically isolates the cable heat exchanger from the conductor of the power cable.

In an embodiment, a charging inlet assembly is provided for an electric vehicle including a housing extending between a front and a rear. The housing has a chamber at the rear and a power connector at the front for receiving a charging connector. The power connector includes a terminal channel between the front and the rear. The charging inlet assembly includes a terminal coupled to the housing including a mating pin at a front of the terminal and a cable connector at a rear of the terminal. The mating pin is positioned in the terminal channel for mating with the charging connector. The cable connector is positioned in the chamber at the rear of the housing. The charging inlet assembly includes a power cable including a conductor terminated to the cable connector at the rear of the terminal. The charging inlet assembly includes a cable heat exchanger positioned in the chamber. The cable heat exchanger includes a manifold including a coolant channel for coolant flow through the manifold. The manifold includes a manifold pocket receiving the power cable. The manifold is pressed against the power cable for actively cooling the conductor of the power cable with the coolant flowing through the coolant channel.

In an embodiment, a cooling system for a power connector of a charging inlet assembly is provided including a cooling adapter configured to be coupled to a housing of the charging inlet assembly. The cooling adapter includes an adapter body forming a cavity and having a cable exit for a power cable of the charging inlet assembly. The cooling adapter includes a supply port and a return port. A coolant supply line is coupled to the supply port and a coolant return line is coupled to the return port. The cooling system includes a cable heat exchanger positioned in the cavity of the cooling adapter. The cable heat exchanger includes a manifold including a coolant channel coupled to the supply port and the return port for coolant flow through the manifold. The manifold includes a manifold pocket configured to receive the power cable and configured to be pressed against the power cable for actively cooling a conductor of the power cable with the coolant flowing through the coolant channel.

DETAILED DESCRIPTION OF THE INVENTION

Figure 1:
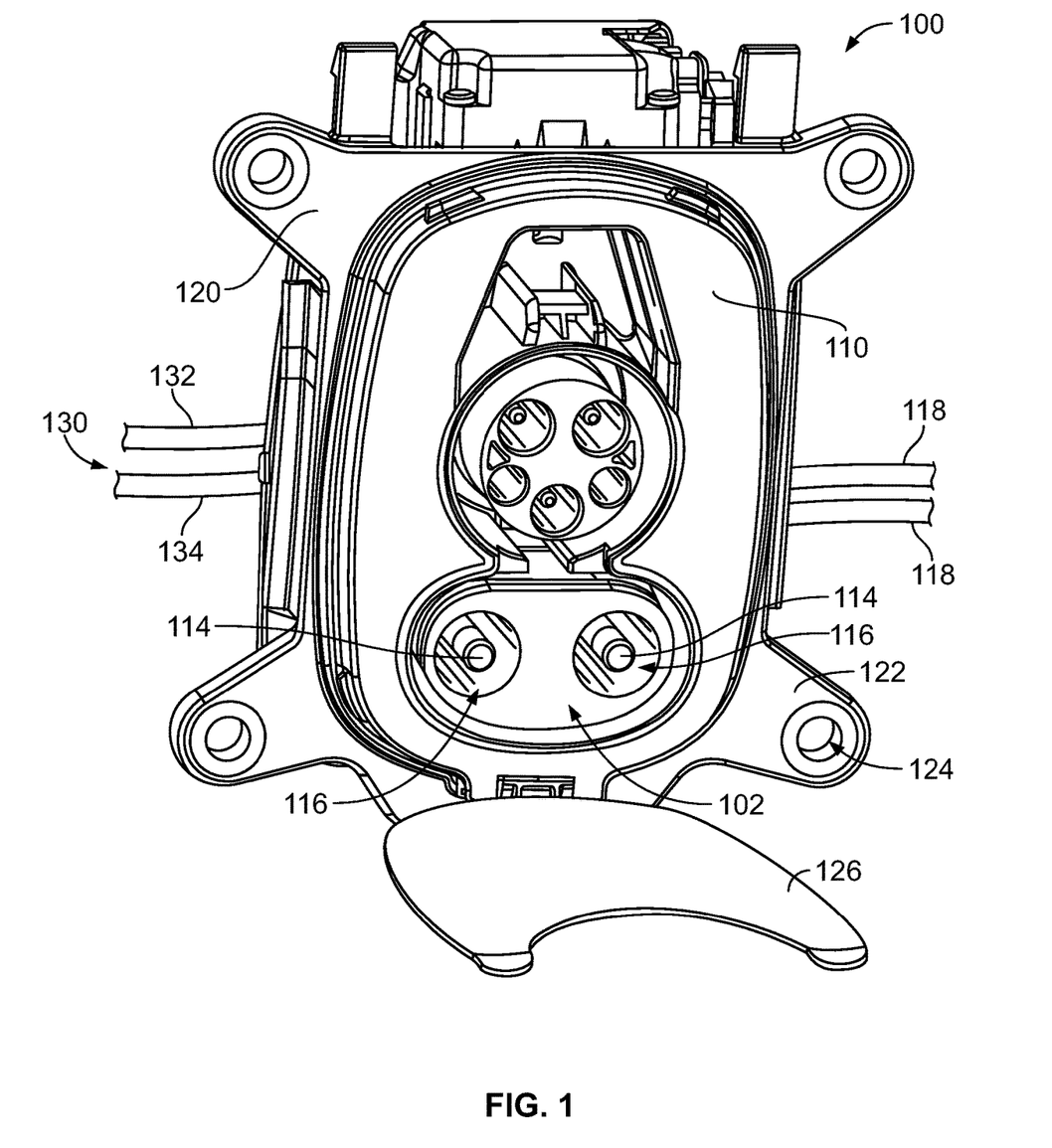
FIG. 1 is a front perspective view of a power connector of a charging inlet assembly having a cooling system in accordance with an exemplary embodiment.
Figure 2:
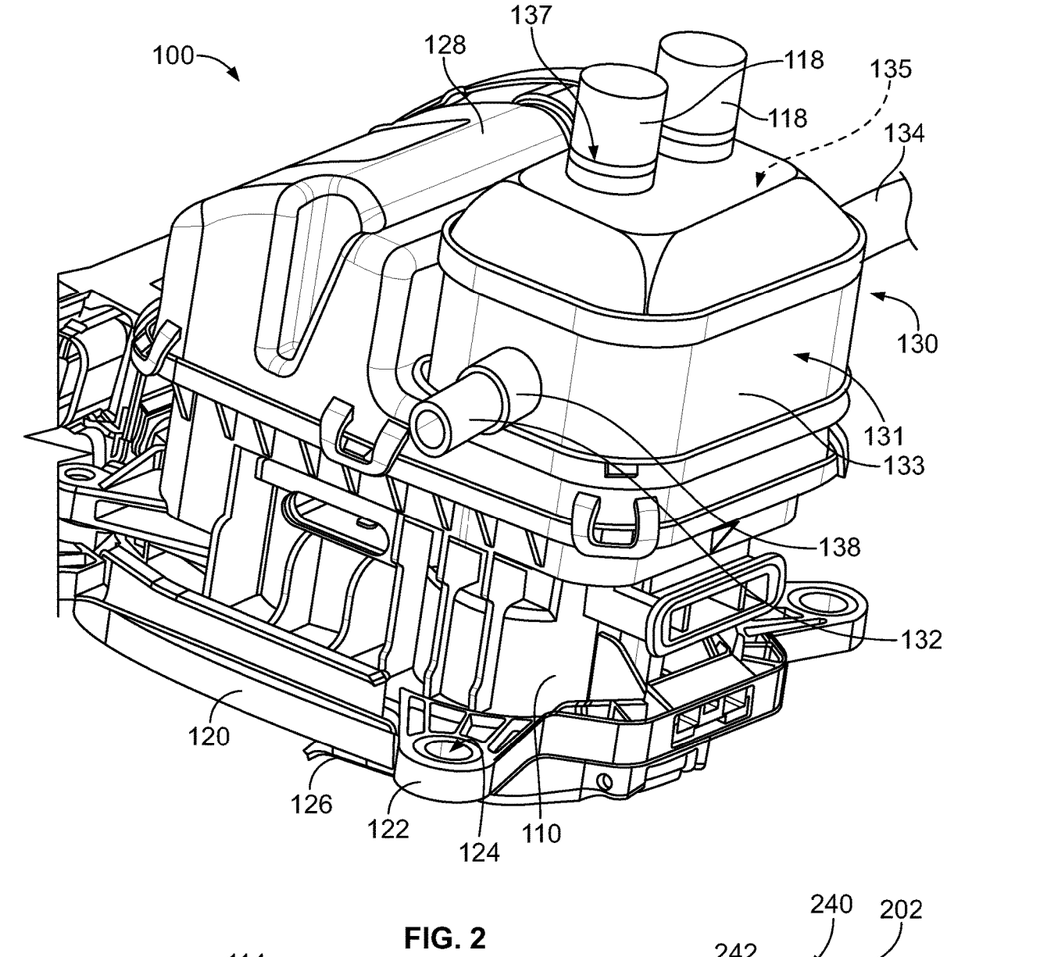
FIG. 2 is a rear perspective view of the charging inlet assembly and the cooling system in accordance with an exemplary embodiment.

FIG. 1 is a front perspective view of a power connector 102 of a charging inlet assembly 100 having a cooling system 130 for cooling components of the power connector 102. FIG. 2 is a rear perspective view of the charging inlet assembly 100 and cooling system 130 in accordance with an exemplary embodiment. While the power connector 102 may be described herein as part of the charging inlet assembly, it is realized that the power connector 102 may be another type of electrical connector.

The charging inlet assembly 100 is used as a charging inlet for a vehicle, such as an electric vehicle (EV) or hybrid electric vehicle (HEV). The charging inlet assembly 100 includes a power connector 102 configured for mating reception with a charging connector (not shown). In an exemplary embodiment, the power connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 114 forming part of the power connector 102. The terminals 114 are electrically connected to corresponding power cables 118. The terminals 114 are configured to be mated to the charging connector. The terminals 114 are received in terminal channels 116 and coupled to the housing 110 in the terminal channels 116. In an exemplary embodiment, the charging inlet assembly 100 includes the cooling system 130 for actively cooling the power cables 118 to cool the terminals 114. For example, coolant may be pumped through lines or channels of the cooling system 130 and flow in thermal communication with the power cables 118 to dissipate heat from the power cables 118, which further dissipates heat from the terminals 114. For example, the power cables 118 are electrically and thermally coupled to the terminals 114. The power cables may be used to sink and dissipate heat from the terminals using the cooling system 130.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a terminal cover 126 (FIG. 1) hingedly coupled to the mounting flange 120 and/or the housing 110. The terminal cover 126 is used to cover corresponding terminals 114. The housing 110 includes a rear cover 128 (FIG. 2) at a rear of the housing 110 that closes access to the rear of the housing 110. The rear cover 128 may be clipped onto the main part of the housing 110, such as using clips or latches. Other types of securing features, such as fasteners may be used in alternative embodiments.

In an exemplary embodiment, the cooling system 130 includes a cooling adapter 131 (FIG. 2) at the rear of the housing 110, such as coupled to the rear cover 128. A seal may be provided at the interface between the cooling adapter 131 and the main body of the housing 110 and/or between pieces of the cooling adapter 131. For example, the cooling adapter 131 may be a multi-piece adapter. The cooling adapter 131 includes an adapter body 133 forming a cavity 135. The adapter body 133 forms part of the housing 110 to enclose the rear chamber of the housing 110. The cavity 135 is open to the rear chamber of the housing 110. The power cables 118 and the cooling components of the cooling system 130 are thermally coupled to the power cables 118 in the cavity 135 and/or the rear chamber of the housing 110. The adapter body 133 includes cable exits 137 for the power cables 118. The cooling adapter 131 includes a supply port 138 and a return port 139 (shown in FIG. 5). A coolant supply line 132 is coupled to the supply port 138. A coolant return line 134 is coupled to the return port 139. In the illustrated embodiment, the supply port 138 and the return port 139 are arranged on opposite sides of the adapter body 133; however, the ports 138, 139 may be at other locations. In an alternative embodiment, the supply port 138 and/or the return port 139 may be located at the rear of the adapter body 133, such as adjacent the cable exits 137, such that the coolant supply line 132 and the coolant return line 134 extend from the rear (for example, parallel to the power cables 118).

Figure 3:
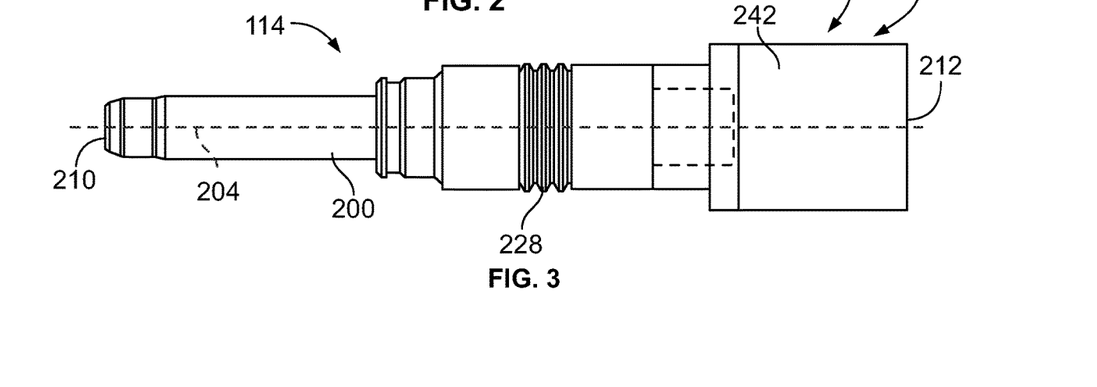
FIG. 3 is a side view of a terminal of the power connector in accordance with an exemplary embodiment.

FIG. 3 is a side view of the terminal 114 in accordance with an exemplary embodiment. The terminal 114 includes a mating pin 200 at a front 210 of the terminal 114 and a cable connector 202 at a rear 212 of the terminal 114. The terminal 114 extends along a longitudinal axis 204. The mating pin 200 is configured to be mated to the charging connector. The cable connector 202 is configured to be electrically connected to the power cable 118 (shown in FIG. 2). In an exemplary embodiment, the mating pin 200 and/or the cable connector 202 are configured to be cooled by reducing the temperature of the power cables 118 using the cooling system 130 (shown in FIG. 2).

In various embodiments, the cable connector 202 is separate and discrete from the mating pin 200 and configured to be mechanically and electrically coupled to the mating pin 200. For example, the cable connector 202 may be press fit onto the mating pin 200. However, the cable connector 202 may be secured to the mating pin 200 by other processes in alternative embodiments, such as welding, riveting, a bolted joint, and the like. In other various embodiments, the cable connector 202 is integral with the mating pin 200, such as formed with the mating pin 200. In various embodiments, the cable connector 202 is configured to be terminated to the power cable 118 by welding the power cable 118 to the cable connector 202. For example, the cable connector 202 may include a weld tab. In other various embodiments, the cable connector 202 is terminated to the power cable 118 by other processes, such as being crimped, soldered, and the like. For example, the cable connector 202 may include a crimp barrel configured to be terminated to the power cable 118.

The mating pin 200 is electrically conductive. For example, the mating pin 200 may be manufactured from a metal material, such as a copper material. In an exemplary embodiment, the mating pin 200 is screw machined. The mating pin 200 may be manufactured from a metal alloy (for example, copper alloy) having additives to increase machinability. In an exemplary embodiment, the mating pin 200 is cylindrical. In an exemplary embodiment, a seal 228 is coupled to the mating pin 200 near a rear end of the mating pin 200 for interface sealing against an interior surface of the terminal channel 116 (shown in FIG. 1).

The cable connector 202 extends from and/or is coupled to the rear end of the mating pin 200. The cable connector 202 may be press-fit on the mating pin 200. The cable connector 202 includes a cable terminating end 240 at the rear 212 of the terminal 114. The power cable 118 is configured to be terminated to the cable terminating end 240. In the illustrated embodiment, the cable connector 202 includes a weld pad 242 at the rear 212 defining the cable terminating end 240. The weld pad 242 may be rectangular or have other shapes in alternative embodiments. The weld pad 242 may include planar, parallel surfaces for welding the power cable 118 to the weld pad 242. The cable terminating end 240 may include a crimp barrel (not shown) rather than the weld pad 242 in alternative embodiments.

Figure 4:
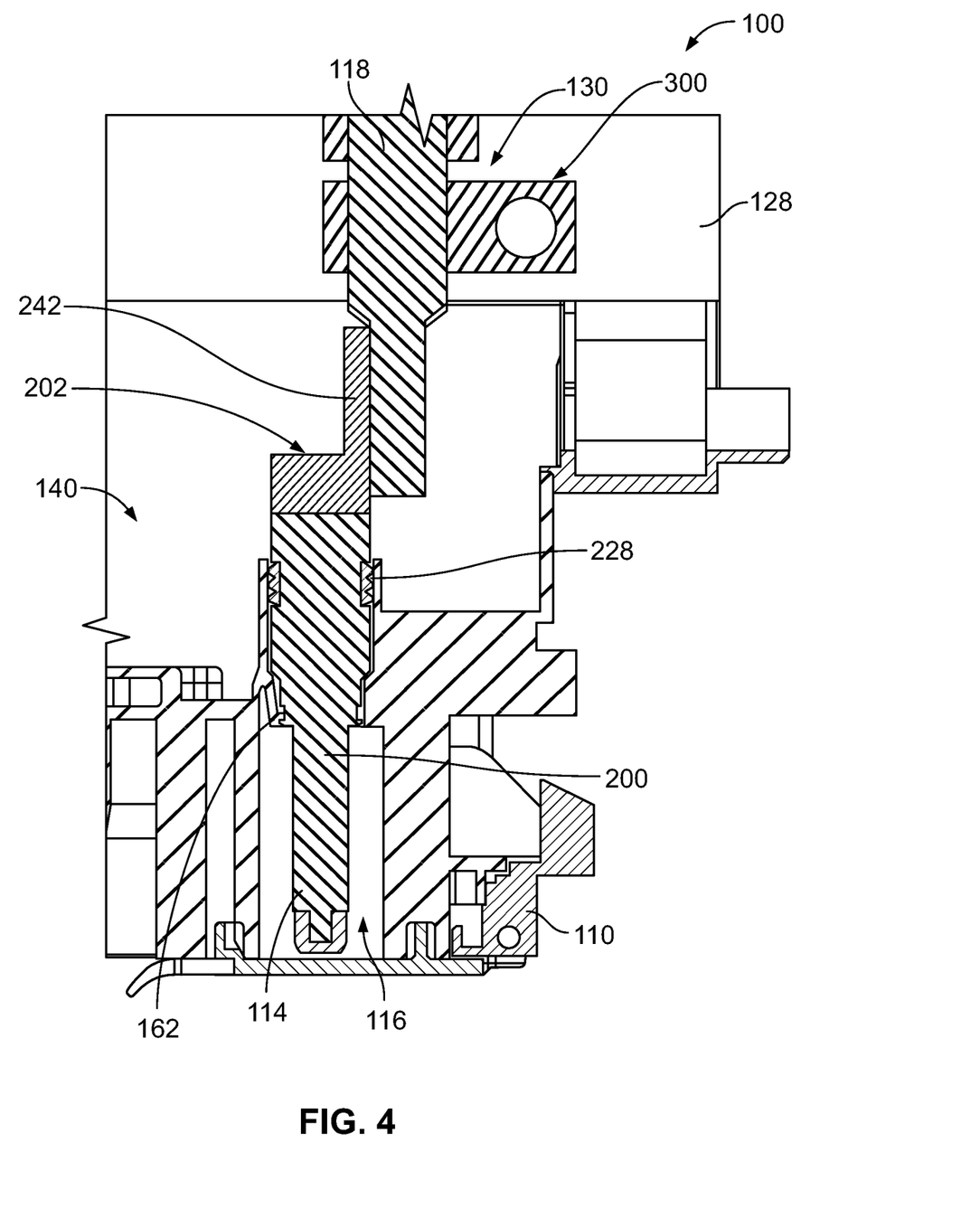
FIG. 4 is a cross-sectional view of the charging inlet assembly in accordance with an exemplary embodiment.

FIG. 4 is a cross-sectional view of the charging inlet assembly 100 in accordance with an exemplary embodiment. FIG. 4 illustrates one of the terminals 114 coupled to the housing 110. The housing 110 has a chamber 140 at the rear of the housing 110. The rear cover 128 is rearward of and closes the chamber 140. The rear cover 128 may include cable exits (for example, openings) that receive the power cables 118 and allow the power cables 118 to exit the chamber 140. The rear cover 128 may include coolant line exits (for example, openings) or ports that allow supply and return of the coolant of the cooling system 130 for actively cooling the power cable 118 and the terminal 114.

The terminal 114 extends into the chamber 140 and the power cable 118 is terminated to the terminal 114 in the chamber 140. The cooling system 130 interfaces with the power cable 118 in the chamber 140 to provide active cooling for the power cable 118 and the terminal 114. For example, the cooling system 130 includes a cable heat exchanger 300 positioned in the chamber 140 to interface with the power cable 118. The cable heat exchanger 300 is thermally coupled to the power cable 118 to dissipate heat from the power cable 118, and thus dissipate heat from the terminal 114. The cooling system 130 lowers the operating temperature of the terminal 114 to improve performance of the charging inlet assembly 100 and/or to allow higher current through the terminal 114 and/or to reduce risk of damage to the terminal 114.

The terminal 114 is received in the corresponding terminal channel 116. The mating pin 200 is located in the terminal channel 116 for interfacing with a charging connector plugged into the housing 110. The housing 110 includes a primary latch 162 extending into the terminal channel 116 to engage and axially retain the terminal 114 in the terminal channel 116. The primary latch 162 may be a deflectable latch. The primary latch 162 may be integral with the housing 110, such as co-molded with the housing 110. The primary latch 162 resists rearward pull out of the terminal 114 from the terminal channel 116. In an exemplary embodiment, the seal 228 is sealed to a surface of the housing 110 defining the terminal channel 116.

In an exemplary embodiment, the terminal 114 is located in the terminal channel 116 such that the cable connector 202 is located immediately rearward of the terminal channel 116. The cable connector 202 extends into the chamber 140 for electrical connection with the power cable 118 and thermal connection with the power cable 118. The power cable 118 is coupled to the weld pad 242 within the chamber 140. In an exemplary embodiment, the power cable 118 may be ultrasonically welded to the weld pad 242, creating a low resistance interface between the terminal 114 and the power cable 118. In other various embodiments, the power cable 118 may be crimped or otherwise mechanically and electrically terminated to the terminal 114. The cooling system 130 is thermally coupled to the power cable 118 immediately rearward of the cable connector 202 to define a low-profile connection between the cooling system 130 and the power cable 118. In various embodiments, the cable heat exchanger 300 may be directly thermally coupled to the outer surface of the power cable 118. In other various embodiments, the cable heat exchanger 300 may be indirectly thermally coupled to the outer surface of the power cable 118, such as through a thermal interface material, a thermal grease or another thermal bridge.

Figure 5:
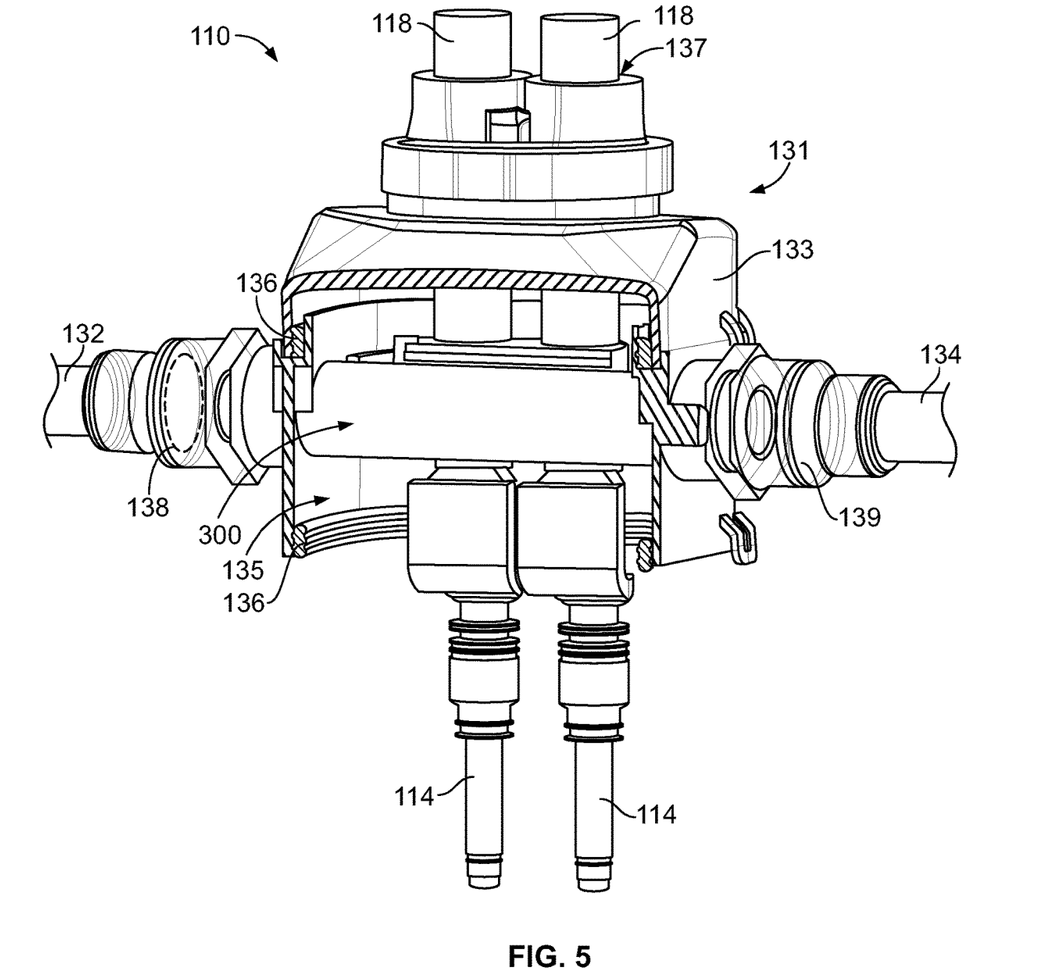
FIG. 5 is a partial sectional view of a portion of the charging inlet assembly in accordance with an exemplary embodiment.

FIG. 5 is a partial sectional view of a portion of the charging inlet assembly 100 in accordance with an exemplary embodiment. FIG. 5 illustrates the pair of power cables 118 terminated to the pair of terminals 114. FIG. 5 illustrates the cooling adapter 131 showing the cable heat exchanger 300 within the cavity 135 of the adapter body 133 thermally coupled to the power cables 118 within the cavity 135. The cooling adapter 131 may include one or more interface seals 136 for interfacing with the housing 110 (shown in FIG. 2) and/or between separate pieces of the cooling adapter 131. For example, the cooling adapter 131 may be a multi-piece adapter. The power cables 118 pass through the cable exits 137 at the rear of the cooling adapter 131. The coolant supply line 132 extends from the supply port 138 and the coolant return line 134 extends from the return port 139. The cable heat exchanger 300 is coupled to the supply port 138 and the return port 139 to couple the cable heat exchanger 300 to the coolant supply line 132 and the coolant return line 134. Coolant flows through the coolant lines 132, 134 to transfer heat from the cable heat exchanger 300.

Figure 6:
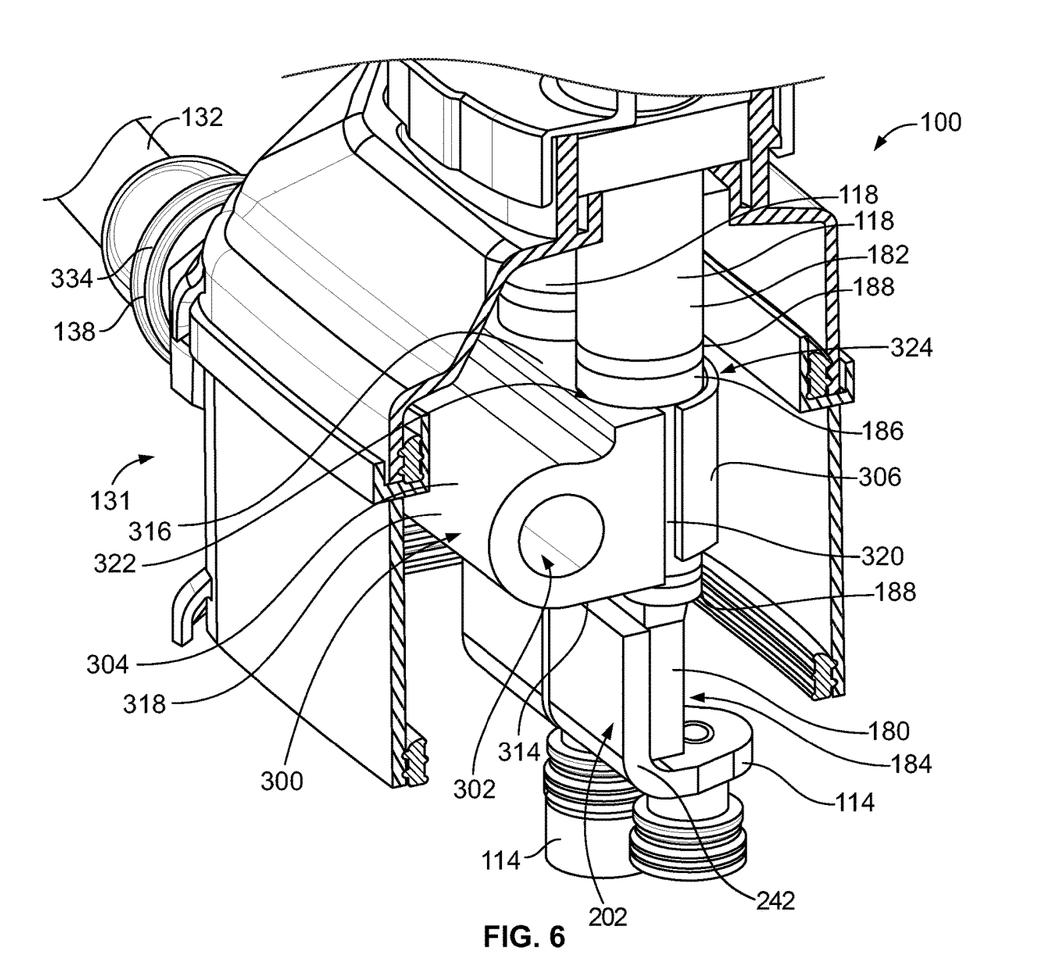
FIG. 6 is a partial sectional view of a portion of the charging inlet assembly in accordance with an exemplary embodiment showing a cooling adapter and a cable heat exchanger of the cooling system.
Figure 7:
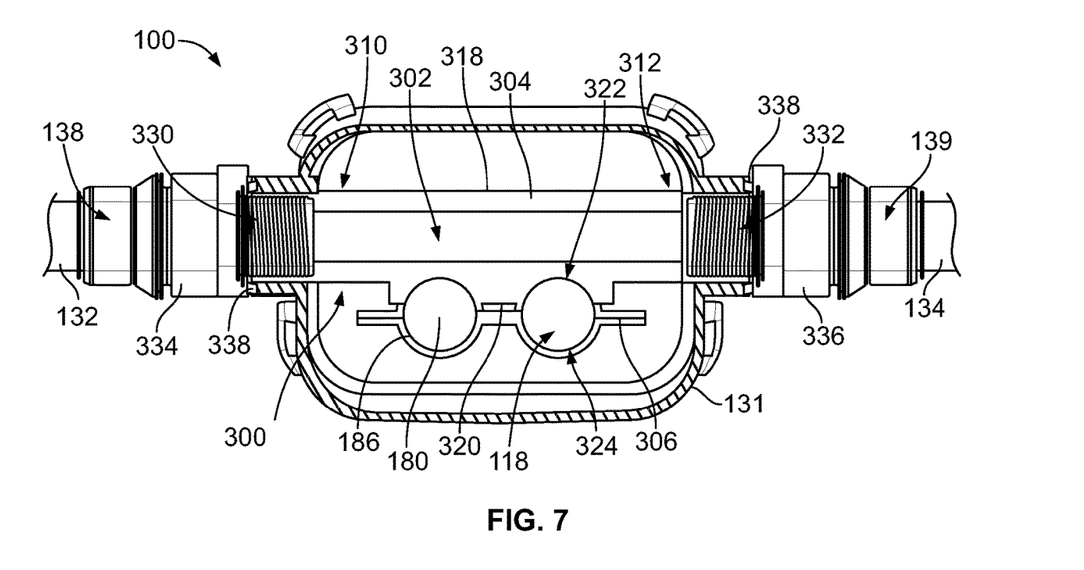
FIG. 7 is a partial sectional view of a portion of the charging inlet assembly in accordance with an exemplary embodiment showing the cooling adapter and the cable heat exchanger.

FIG. 6 is a partial sectional view of a portion of the charging inlet assembly 100 in accordance with an exemplary embodiment showing the cooling adapter 131 and the cable heat exchanger 300. FIG. 7 is a partial sectional view of a portion of the charging inlet assembly 100 in accordance with an exemplary embodiment showing the cooling adapter 131 and the cable heat exchanger 300.

The power cables 118 extend into the cooling adapter 131 for termination to the terminals 114. Each power cable 118 includes a conductor 180 and a jacket 182 surrounding the conductor 180. The conductor 180 is terminated to the weld pad 242 of the cable connector 202. The conductor 180 may be a stranded conductor or a solid-core conductor 180. At a terminating end 184 of the power cable 118, a portion of the jacket 182 is removed to expose the conductor 180 for termination to the terminal 114. In an exemplary embodiment, the cable heat exchanger 300 is coupled to the power cable 118 at the exposed portion of the conductor 180 (for example, forward of the end of the jacket 182. As such, the cable heat exchanger 300 is thermally coupled to the conductor 180 to efficiently dissipate heat from the conductor 180, which dissipates heat from the terminal 114.

In an exemplary embodiment, the power cable 118 includes a thermally conductive separator 186 surrounding the conductor 180. The separator 186 is manufactured from a material that is electrically insulative, but thermally conductive. As such, the separator 186 efficiently transfers heat between the conductor 180 and the cable heat exchanger 300. The thermally conductive separator 186 is relatively thin to allow efficient thermal transfer between the conductor 180 and the cable heat exchanger 300. The separator 186 also electrically isolates the cable heat exchanger 300 from the conductor 180 of the power cable 118, such as to prevent short circuiting of the power cables 118 and/or shock or damage due to inadvertent touching of the cable heat exchanger 300. In an exemplary embodiment, the thermally conductive separator 186 is coaxial with the conductor 180 of the power cable 118. For example, the thermally conductive separator 186 is wrapped around the conductor 180. The separator 186 may be manufactured from a material that is electrically insulative and highly thermally conductive. The separator 186 may be a thermally conductive epoxy, a thermoplastic material or a thermoset material. The separator 186 may be manufactured from beryllium oxide, aluminum oxide, aluminum nitride, boron nitride silicone, ceramic, Kapton, nylon, polyester, and the like. The separator 186 may be a pre-formed structure, such as a film, a pad, a sheet, a tube, an injection molded piece, and the like. In other various embodiments, the separator 186 may be applied in situ, such as a grease or a paste. In various embodiments, the thermally conductive separator 186 is a heat shrink tube applied to an outer surface of the conductor 180 of the power cable 118. The thermally conductive separator 186 may be manufactured from a doped polymer material, such as a plastic material having thermally conductive materials added to the plastic material to increase the thermal conductivity. Other types of thermally conductive, electrically isolating material may be used in alternative embodiments. In an exemplary embodiment, the separator 186 is secured to the power cable 118 using fasteners 188, such as bands, clips, adhesive, and the like.

In an exemplary embodiment, the cable heat exchanger 300 includes a manifold 304 having a coolant channel 302 therethrough and a backer plate 306 coupled to the manifold 304. The power cables 118 are configured to be pressed between the manifold 304 and the backer plate 306 when the backer plate 306 is coupled to the manifold 304. The backer plate 306 may be secured to the manifold 304 using a fastener, clips, latches or other securing features. The separator 186 is positioned between the manifold 304 and the conductor 180 and may be positioned between the backer plate 306 and the conductor 180. The separator 186 electrically isolates the manifold 304 and the backer plate 306 from the conductor 180 of the power cable 118 to prevent short circuiting of the power cables 118.

The manifold 304 extends between a supply side 310 and a return side 312. The manifold 304 includes a front 314 and a rear 316. The manifold 304 includes an outer end 318 and an inner end 320 opposite the outer end 318. The inner end 320 faces the power cables 118. In an exemplary embodiment, the manifold 304 includes manifold pockets 322 at the inner end 320 that receive the power cables 118. For example, the manifold pockets 322 are concave having radius of curvature similar to a radius of curvature of the power cables 118. As such, the inner end 320 has a large surface area interfacing with the power cables 118. The manifold pockets 322 may be shaped to engage approximately 180° around the power cables 118. In an exemplary embodiment, the backer plate 306 includes backer plate pockets 324, aligned with the manifold pockets 322, to receive the power cables 118. In various embodiments, the backer plate 306 and the inner end 320 of the manifold 304 may surround approximately 360° around each of the power cables 118. When the cable heat exchanger 300 is assembled, the power cable 118 is pressed between the backer plate 306 and the inner end 320 of the manifold 304.

The coolant channel 302 is configured for flow communication with the supply and return ports 138, 139 and the supply and return coolant lines 132, 134. The coolant is routed through the coolant channel 302 to dissipate heat from the manifold 304 of the cable heat exchanger 300 for cooling the power cable 118, and thus cooling the terminal 114. In various embodiments, the coolant channel 302 has a circular cross-section. The coolant channel 302 extends between an inlet 330 at the supply side 310 and an outlet 332 at the return side 312. Optionally, the inlet 330 may be threaded (for example, internal threading or external threading) for threaded coupling with the supply coolant line 132, such as to a fluid coupler 334 at the end of the supply coolant line 132. The outlet 332 may be threaded (for example, internal threading or external threading) for threaded coupling with the return coolant line 134, such as to a fluid coupler 336 at the end of the return coolant line 134. In an exemplary embodiment, the coolant channel 302 extends along a longitudinal axis. However, the coolant channel 302 may extend along a non-linear path, such as a curved or serpentine path in alternative embodiments. Optionally, seals 338 may be provided at the supply side 310 and/or the return side 312 for interfacing between the manifold 304 and the fluid couplers 334, 336 and/or the cooling adapter 131.

Figure 8:
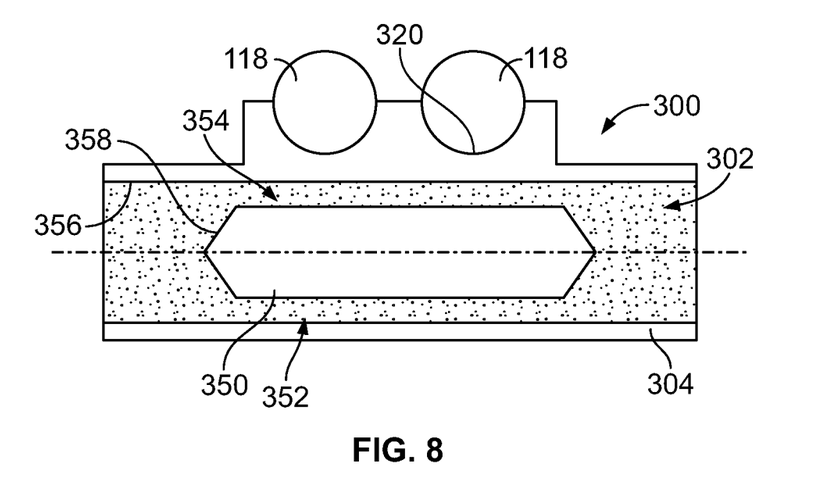
FIG. 8 is a cross-sectional view of the cable heat exchanger in accordance with an exemplary embodiment.

FIG. 8 is a cross-sectional view of the cable heat exchanger 300 in accordance with an exemplary embodiment. The inner end 320 of the manifold 304 faces and interfaces with the power cables 118. The cable heat exchanger 300 includes a volume displacement element 350 positioned in the coolant channel 302 to reduce a volume of the coolant channel 302 along a section 352 of the coolant channel 302 (for example, along a central section aligned with the power cables 118). In the reduced volume section 352 of the coolant channel 302, the flow rate of the coolant is increased. For example, the flow rate is increased in spaces 354 between the volume displacement element 350 and an inner wall 356 of the coolant channel 302. The increased flow rate increases heat transfer between the manifold 304 and the coolant, thus reducing the temperature of the manifold 304, and likewise the power cable 118 and the terminal 114.

In an exemplary embodiment, the volume displacement element 350 is approximately centered in the coolant channel 302 forming approximately equal spaces 354 on opposite sides of the volume displacement element 350. However, other locations are possible in alternative embodiments. The volume displacement element 350 may have ramped surfaces 358 at the leading end and the trailing end of the volume displacement element 350 to reduce turbulence in the coolant channel 302.

Figure 9:
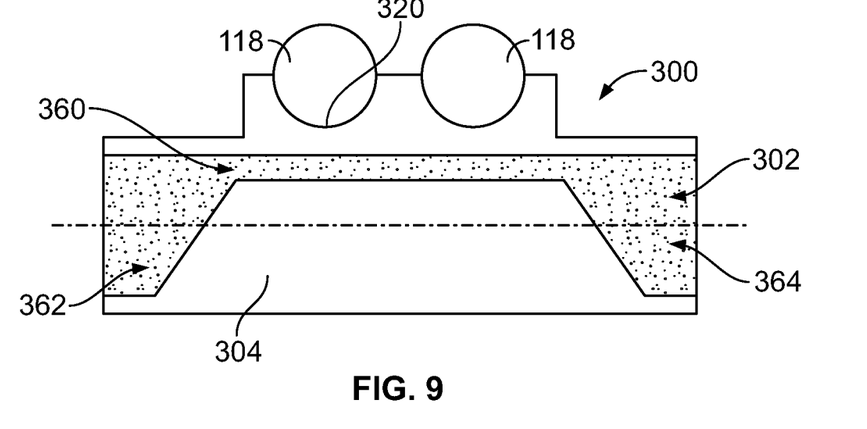
FIG. 9 is a cross-sectional view of the cable heat exchanger in accordance with an exemplary embodiment.

FIG. 9 is a cross-sectional view of the cable heat exchanger 300 in accordance with an exemplary embodiment. The cable heat exchanger 300 includes a nozzle 360 in the coolant channel 302. The nozzle 360 has a reduced dimension (for example, a reduced width) compared to an upstream segment 362 and/or a downstream segment 364 of the coolant channel 302. The nozzle 360 reduces the area of the coolant channel 302 to increase the flow rate of the coolant through the nozzle 360. In an exemplary embodiment, the nozzle 360 is aligned with the power cables 118. The increased flow rate increases heat transfer between the manifold 304 and the coolant, thus reducing the temperature of the manifold 304, and likewise the power cable 118 and the terminal 114.

Figure 10:
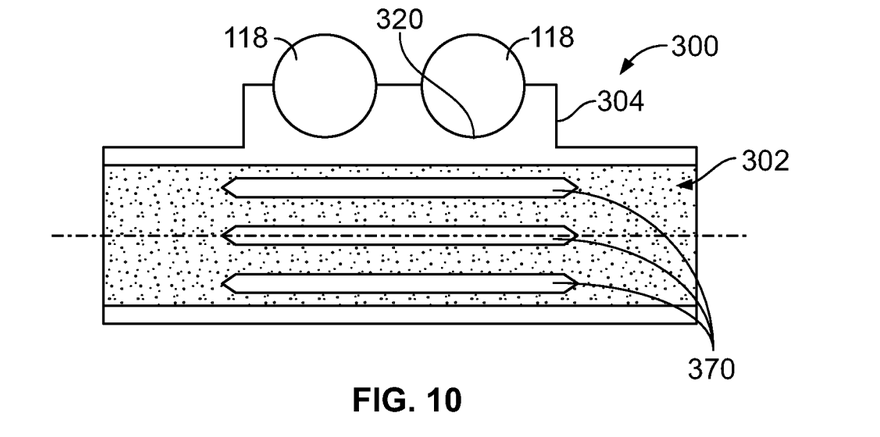
FIG. 10 is a cross-sectional view of the cable heat exchanger in accordance with an exemplary embodiment.

FIG. 10 is a cross-sectional view of the cable heat exchanger 300 in accordance with an exemplary embodiment. The cable heat exchanger 300 includes heat exchange fins 370 positioned in the coolant channel 302. The heat exchange fins 370 are thermally coupled to the manifold 304 and transfer heat from the manifold 304 to the coolant. For example, the heat exchange fins 370 may be integral with the manifold 304. The heat exchange fins 370 increase surface area of the cable heat exchanger 300 in thermal contact with the coolant to increase the thermal effectiveness of the cable heat exchanger 300. In an exemplary embodiment, the heat exchange fins 370 extend parallel to the coolant flow direction through the coolant channel 302. In an exemplary embodiment, the heat exchange fins 370 may be approximately equally spaced apart forming spaces there between having generally equal widths on opposite sides of the heat exchange fins 370. However, other locations and orientations are possible in alternative embodiments. The heat exchange fins 370 may have ramped surfaces at the leading end and the trailing end of the heat exchange fins 370 to reduce turbulence in the coolant channel 302.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector comprising:
   a housing extending between a front and a rear, the housing having a chamber at the rear, the housing having a terminal channel between the front and the rear;
   a terminal coupled to the housing, the terminal including a mating pin at a front of the terminal and a cable connector at a rear of the terminal, the mating pin positioned in the terminal channel for mating with a charging connector, the cable connector positioned in the chamber at the rear of the housing;
   a power cable terminated to the cable connector at the rear of the terminal, the power cable including a conductor; and
   a cable heat exchanger positioned in the chamber, the cable heat exchanger being thermally coupled to the conductor of the power cable, the cable heat exchanger including a coolant channel for coolant flow through the cable heat exchanger for actively cooling the conductor of the power cable.

2. The power connector of claim 1, wherein the cable heat exchanger includes a manifold forming the coolant channel, the coolant channel having an inlet and an outlet, the manifold providing coolant flow between inlet and the outlet.

3. The power connector of claim 1, wherein the cable heat exchanger includes a manifold forming the coolant channel therethrough, the manifold having an inner end including a manifold pocket receiving the power cable, the cable heat exchanger including a backer plate coupled to the inner end of the manifold, the backer plate including a backer plate pocket aligned with the manifold pocket and receiving the power cable, the power cable being pressed between the backer plate and the inner end of the manifold.

4. The power connector of claim 1, wherein the cable heat exchanger includes a manifold forming the coolant channel therethrough, the manifold defining a heat sink to dissipate heat from the conductor of the power cable into the coolant flowing through the manifold.

5. The power connector of claim 1, wherein the cable heat exchanger includes a thermally conductive separator electrically isolating the cable heat exchanger from the conductor of the power cable.

6. The power connector of claim 5, wherein the thermally conductive separator is coaxial with the conductor of the power cable.

7. The power connector of claim 5, wherein the thermally conductive separator is a heat shrink tube applied to an outer surface of the conductor of the power cable.

8. The power connector of claim 5, wherein the power cable includes a jacket surrounding the conductor of the power cable, a terminating end of the power cable having a segment of the jacket removed to expose the conductor of the power cable, the thermally conductive separator being coupled to the conductor of the power cable, the thermally conductive separator having a thickness thinner than a thickness of the jacket.

9. The power connector of claim 1, wherein the cable heat exchanger includes a volume displacement element positioned in the coolant channel to reduce a volume of the coolant channel and increase a coolant flow rate through the coolant channel along the volume displacement element.

10. The power connector of claim 1, wherein the cable heat exchanger includes heat exchange fins extending into the coolant channel to increase surface area of the cable heat exchanger in thermal contact with the coolant, the heat exchange fins extending parallel to the coolant flow direction through the coolant channel.

11. The power connector of claim 1, wherein the cable heat exchanger forms a nozzle in the coolant channel, the nozzle having a reduced dimension compared to an upstream segment of the coolant channel upstream of the nozzle.

12. The power connector of claim 1, further comprising a second terminal and a second power cable terminated to the second terminal, the cable heat exchanger being thermally coupled to a conductor of the second power cable, the coolant channel flowing in close proximity to both the power cable and the second power cable for actively cooling the conductor of the power cable and the conductor of the second power cable.

13. The power connector of claim 1, further comprising a cooling assembly including a cooling adapter coupled to the housing of the charging inlet assembly, the cooling adapter including an adapter body forming a cavity, the adapter body having a cable exit for the power cable of the charging inlet assembly, the cooling adapter including a supply port and a return port, a coolant supply line being coupled to the supply port, a coolant return line being coupled to the return port, wherein the supply port is coupled to an inlet of the coolant channel and the return port is coupled to an outlet of the coolant channel.

14. A charging inlet assembly for an electric vehicle comprising:
   a housing extending between a front and a rear, the housing having a chamber at the rear, the housing having a power connector at the front for receiving a charging connector, the power connector including a terminal channel between the front and the rear;
   a terminal coupled to the housing, the terminal including a mating pin at a front of the terminal and a cable connector at a rear of the terminal, the mating pin positioned in the terminal channel for mating with the charging connector, the cable connector positioned in the chamber at the rear of the housing;

a power cable terminated to the cable connector at the rear of the terminal, the power cable including a conductor; and a cable heat exchanger positioned in the chamber, the cable heat exchanger including a manifold including a coolant channel for coolant flow through the manifold, the manifold including a manifold pocket receiving the power cable and being pressed against the power cable for actively cooling the conductor of the power cable with the coolant flowing through the coolant channel.

15. The charging inlet assembly of claim 14, wherein the power cable includes a thermally conductive separator between the conductor of the power cable and the manifold to electrically isolate the conductor of the power cable from the manifold.

16. The charging inlet assembly of claim 15, wherein the thermally conductive separator is coaxial with the conductor of the power cable.

17. The charging inlet assembly of claim 14, wherein the manifold includes an inner end, the manifold pocket formed at the inner end for receiving the power cable, the cable heat exchanger including a backer plate coupled to the inner end of the manifold, the backer plate including a backer plate pocket aligned with the manifold pocket and receiving the power cable, the power cable being pressed between the backer plate and the inner end of the manifold.

18. The charging inlet assembly of claim 14, further comprising a cooling assembly including a cooling adapter coupled to the housing of the charging inlet assembly, the cooling adapter including an adapter body forming a cavity, the adapter body having a cable exit for the power cable of the charging inlet assembly, the cooling adapter including a supply port and a return port, a coolant supply line being coupled to the supply port, a coolant return line being coupled to the return port, wherein the supply port is coupled to an inlet of the coolant channel and the return port is coupled to an outlet of the coolant channel.

19. A cooling system for a power connector of a charging inlet assembly, the cooling system comprising:

a cooling adapter configured to be coupled to a housing of the charging inlet assembly, the cooling adapter including an adapter body forming a cavity, the adapter body having a cable exit for a power cable of the charging inlet assembly, the cooling adapter including a supply port and a return port;

a coolant supply line coupled to the supply port;

a coolant return line coupled to the return port; and a cable heat exchanger positioned in the cavity of the cooling adapter, the cable heat exchanger including a manifold including a coolant channel coupled to the supply port and the return port for coolant flow through the manifold, the manifold including a manifold pocket configured to receive the power cable and configured to be pressed against the power cable for actively cooling a conductor of the power cable with the coolant flowing through the coolant channel.

20. The cooling system of claim 19, wherein the power cable includes a thermally conductive separator between the conductor of the power cable and the manifold to electrically isolate the conductor of the power cable from the manifold.

* * * * *